(12) United States Patent
Reinholdt

(10) Patent No.: US 10,913,649 B2
(45) Date of Patent: Feb. 9, 2021

(54) FLUID NOZZLE WITH ONE OR MORE SENSORS

(71) Applicant: Eaton Intelligent Power Limited, Dublin (IE)

(72) Inventor: James W. Reinholdt, San Clemente, CA (US)

(73) Assignee: Eaton Intelligent Power Limited, Dublin (IE)

( * ) Notice: Subject to any disclaimer, the term of this patent is extended or adjusted under 35 U.S.C. 154(b) by 100 days.

(21) Appl. No.: 16/056,686

(22) Filed: Aug. 7, 2018

(65) Prior Publication Data

US 2019/0071300 A1 Mar. 7, 2019

Related U.S. Application Data

(60) Provisional application No. 62/553,245, filed on Sep. 1, 2017.

(51) Int. Cl.
*B67D 7/40* (2010.01)
*B67D 7/32* (2010.01)
(Continued)

(52) U.S. Cl.
CPC ........... *B67D 7/3272* (2013.01); *B64D 39/06* (2013.01); *B67D 7/145* (2013.01); *B67D 7/348* (2013.01);
(Continued)

(58) Field of Classification Search
CPC .......... B67C 3/2637; B67D 7/32; B67D 7/34; B67D 7/14; B67D 7/40; B67D 7/3272; B67D 7/348; B67D 2007/0474; B67D 7/145; B67D 7/50; B67D 7/52; B67D 2007/0419; B67D 2007/0444;
(Continued)

(56) References Cited

U.S. PATENT DOCUMENTS

| 2,693,931 | A | * | 11/1954 | Emerick | ............... | F16K 47/023 |
| | | | | | | 251/50 |
| 2,733,079 | A | * | 1/1956 | Worlidge | ............... | B64D 39/06 |
| | | | | | | 137/614.03 |

(Continued)

FOREIGN PATENT DOCUMENTS

JP 2011031919 A * 2/2011

OTHER PUBLICATIONS

JP-2011031919-A English Translation of Description (Year: 2011).*
French Search Report FR1857719, dated Jul. 21, 2020.

*Primary Examiner* — Andrew D Stclair
*Assistant Examiner* — Stephanie A Shrieves
(74) *Attorney, Agent, or Firm* — Fishman Stewart PLLC

(57) ABSTRACT

A fluid nozzle includes a housing, a poppet configured to move within the housing, and a contact sensor disposed in the housing and configured to sense a position of the poppet. A contact sensor may include an actuation rod configured to move in response to contact with the poppet, an actuation rod spring configured to apply a biasing force to the actuation rod, a push rod, a rolling member disposed between the actuation rod and the push rod, and a switch actuated via movement of the push rod. In a connected position of the poppet, the actuation rod may push the rolling member, the rolling member may push the push rod, and the push rod may activate the switch to indicate a connection.

19 Claims, 7 Drawing Sheets

(51) Int. Cl.
  *B67D 7/34* (2010.01)
  *B64D 39/06* (2006.01)
  *B67D 7/14* (2010.01)
  *B67D 7/04* (2010.01)

(52) U.S. Cl.
  CPC ........ *B67D 7/40* (2013.01); *B67D 2007/0474* (2013.01)

(58) Field of Classification Search
  CPC .......... B64D 39/00; F16K 15/18; F16L 29/02; F16L 37/28; H01H 3/02; H01H 3/32; H01H 3/46; H01H 35/24; Y10T 137/8225
  USPC ....... 141/351, 206, 348, 349, 350; 200/81 R, 200/81.9 R, 82 R, 330, 331, 337
  See application file for complete search history.

(56) References Cited

U.S. PATENT DOCUMENTS

| | | | |
|---|---|---|---|
| 3,035,595 A * | 5/1962 | Beason, Jr. | F16K 13/04 137/71 |
| 3,976,100 A * | 8/1976 | Souslin | B64D 39/06 137/614.03 |
| 4,216,162 A * | 8/1980 | Arlt | C07D 263/12 548/216 |
| 4,282,909 A * | 8/1981 | Clark | B64D 39/06 141/231 |
| 4,438,793 A * | 3/1984 | Brown | B64D 39/06 141/346 |
| 6,343,630 B1 * | 2/2002 | Dubinsky | F16L 37/0848 137/614.05 |
| 7,328,719 B2 * | 2/2008 | Madden | F16K 37/0041 137/552 |
| 7,954,764 B2 | 6/2011 | Ortega De Miguel et al. | |
| 8,768,631 B2 * | 7/2014 | Wilke | F16K 37/0091 702/35 |
| 8,813,348 B2 * | 8/2014 | Williams | F16L 19/103 29/707 |
| 9,840,336 B2 | 12/2017 | Barsheshet et al. | |
| 10,279,923 B2 | 5/2019 | Marcos Montes et al. | |
| 2006/0032535 A1 | 2/2006 | Madden | |
| 2012/0305710 A1 * | 12/2012 | Fernandez Garcia | B64D 39/06 244/135 A |
| 2013/0020441 A1 * | 1/2013 | Peake | B64D 45/00 244/135 A |
| 2013/0161449 A1 * | 6/2013 | Marcos Montes | B64D 39/06 244/135 A |
| 2013/0231874 A1 | 9/2013 | Wilke | |
| 2013/0299639 A1 * | 11/2013 | Martinez Vazquez | B64D 39/00 244/135 A |
| 2016/0083105 A1 * | 3/2016 | Mouskis | B64D 39/06 244/135 A |
| 2016/0178126 A1 * | 6/2016 | Lee | B01D 46/4227 141/1 |
| 2016/0311554 A1 * | 10/2016 | Marcos Montes | B64D 39/06 |
| 2017/0073080 A1 * | 3/2017 | Hughes | B64D 39/06 |

* cited by examiner

US 10,913,649 B2

FLUID NOZZLE WITH ONE OR MORE SENSORS

CROSS-REFERENCE TO RELATED APPLICATION

This application claims the benefit of U.S. Provisional Patent Application Ser. No. 62/553,245, filed on Sep. 1, 2017, the disclosure of which is hereby incorporated herein by reference in its entirety.

TECHNICAL FIELD

The present disclosure generally relates to fluid nozzles, including fluid nozzles that may be used in connection with aerial refueling of aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some nozzle designs, it may be difficult to determine if a nozzle and a receptacle are sufficiently connected. If it is incorrectly determined that a nozzle and a receptacle are connected, the nozzle, the receptacle, and/or other components may be damaged.

There is a desire for solutions/options that minimize or eliminate one or more challenges or shortcomings of fluid nozzles. The foregoing discussion is intended only to illustrate examples of the present field and should not be taken as a disavowal of scope.

SUMMARY

In embodiments, a fluid nozzle may include a housing, a poppet configured to move within the housing, and/or a contact sensor disposed in the housing and configured to sense a position of the poppet. A contact sensor may include an actuation rod configured to move in response to contact with the poppet, an actuation rod spring configured to apply a biasing force to the actuation rod, a push rod, a rolling member disposed between the actuation rod and the push rod, and/or a switch actuated via movement of the push rod. In a connected position of the poppet, the actuation rod may push the rolling member (e.g., radially outward), the rolling member may push the push rod (e.g., radially outward), and the push rod may activate the switch to indicate sufficient contact. A nozzle may include a connection sensor that may include a connection sensor switch configured to sense movement of the one or more latches of the nozzle. Movement of the latches may be caused via rollers of a receptacle.

With embodiments, a fluid nozzle may include a housing, a poppet configured to move within the housing to control fluid flow in the housing, one or more latches that may be disposed outside the housing, and a connection sensor. The connection sensor may include a connection switch that may be configured to sense movement of the one or more latches and/or provide an indication of sufficient connection. The one or more latches may be configured to translate relative to the housing upon actuation by one or more rollers of a receptacle.

In embodiments, a method of connecting a nozzle with a receptacle may include inserting an end of the nozzle into the receptacle, moving a poppet of the nozzle into contact with a pedestal valve of the receptacle, moving the poppet into contact with an actuation rod, moving the actuation rod such that a rolling member moves into a cavity of a housing of the nozzle and the rolling member causes a push rod to move, activating a contact switch via movement of the push rod, and providing an indication of sufficient contact upon activation of the contact switch.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
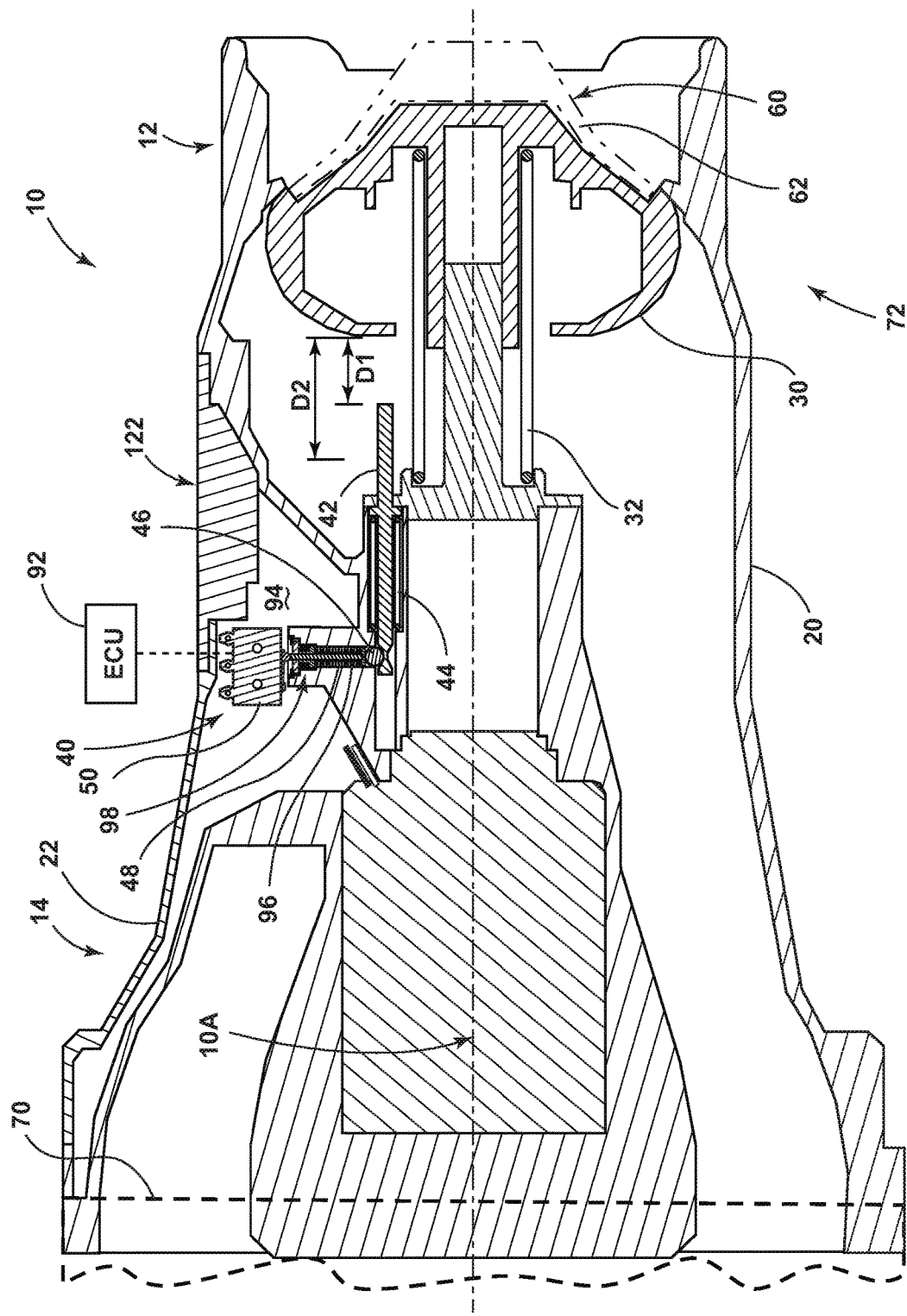
FIG. 1 is a cross-sectional view generally illustrating an embodiment of a fluid nozzle including a contact sensor according to teachings of the present disclosure.
Figure 2:
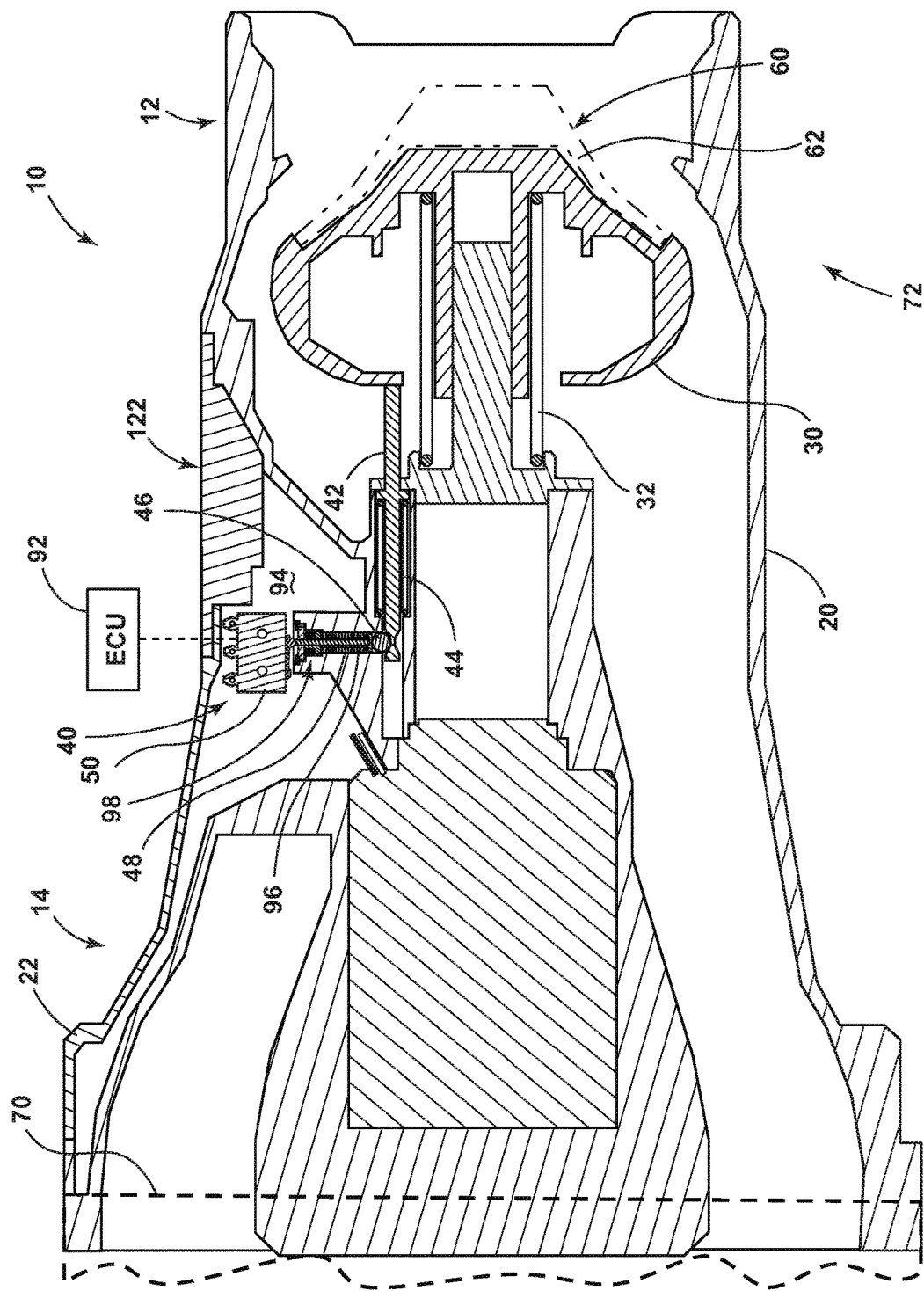
FIGS. 2 and 3 are cross-sectional views generally illustrating embodiments of fluid nozzles including a contact sensor according to teachings of the present disclosure.
Figure 3:
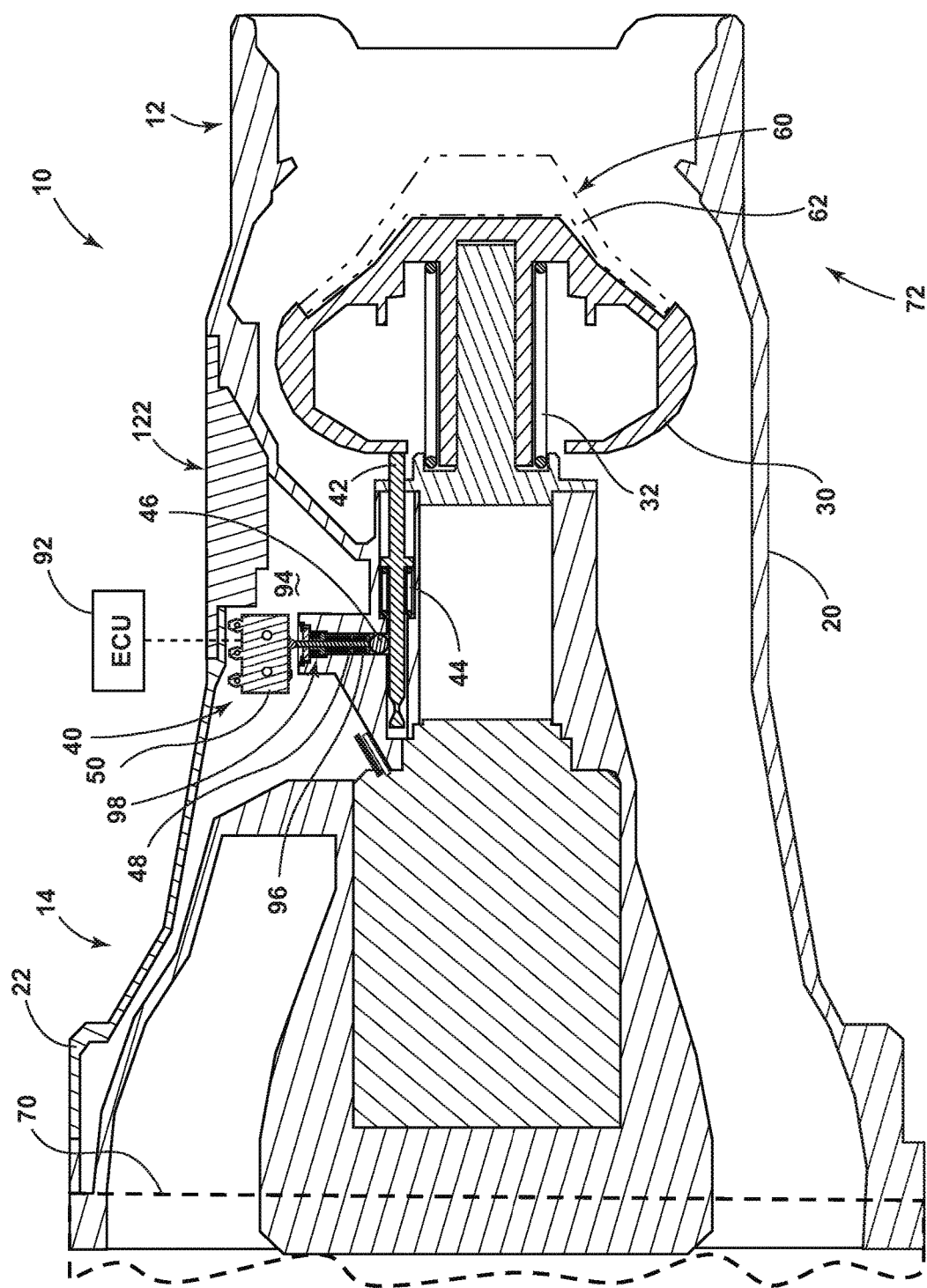

In embodiments, such as generally illustrated in FIG. 1, a nozzle 10 may include an axis 10A, a housing 20, a poppet 30, and/or a contact sensor 40. A first end 12 of the nozzle 10 may be configured for insertion into a receptacle 60, such as a fuel boom receptacle of a receiving aircraft. A second end 14 of the nozzle 10 may be configured for connection with a fluid conduit 70, such as a fuel boom of a tanker aircraft. A poppet 30 may move between a first/closed position, such as generally illustrated in FIG. 1, a second/partially open position, such as generally illustrated in FIG. 2, and/or a third/open position, such as generally illustrated in FIG. 3. Movement of the poppet 30 may control fluid flow through the nozzle 10 and/or through the housing 20. In a first poppet position, flow of fluid between the first end 12 and the second end 14 may be restricted and/or prevented. In a second poppet position, flow of fluid between first end 12 and second end 14 may be partially restricted. In a third poppet position, flow of fluid between first end 12 and second end 14 may not be materially restricted by the poppet 30.

With embodiments, a nozzle 10 may include a poppet spring 32 that may bias the poppet 30 toward a first position (e.g., may bias the nozzle 10 closed). If the first end 12 of the nozzle 10 is inserted into a receptacle 60, a portion of the receptacle 60, such as a pedestal valve 62, may contact the poppet 30. If a connection force is sufficiently great, the connection force may overcome a biasing force provided by the poppet spring 32 and may cause the poppet 30 to move (e.g., translate axially) toward the second end 14. For example and without limitation, insertion of the nozzle 10 into the receptacle 60 may cause the poppet 30 to move from a first position to or toward a second position and/or a third position. A nozzle assembly 72 may include a nozzle 10 and a receptacle 60.

Figure 1A:
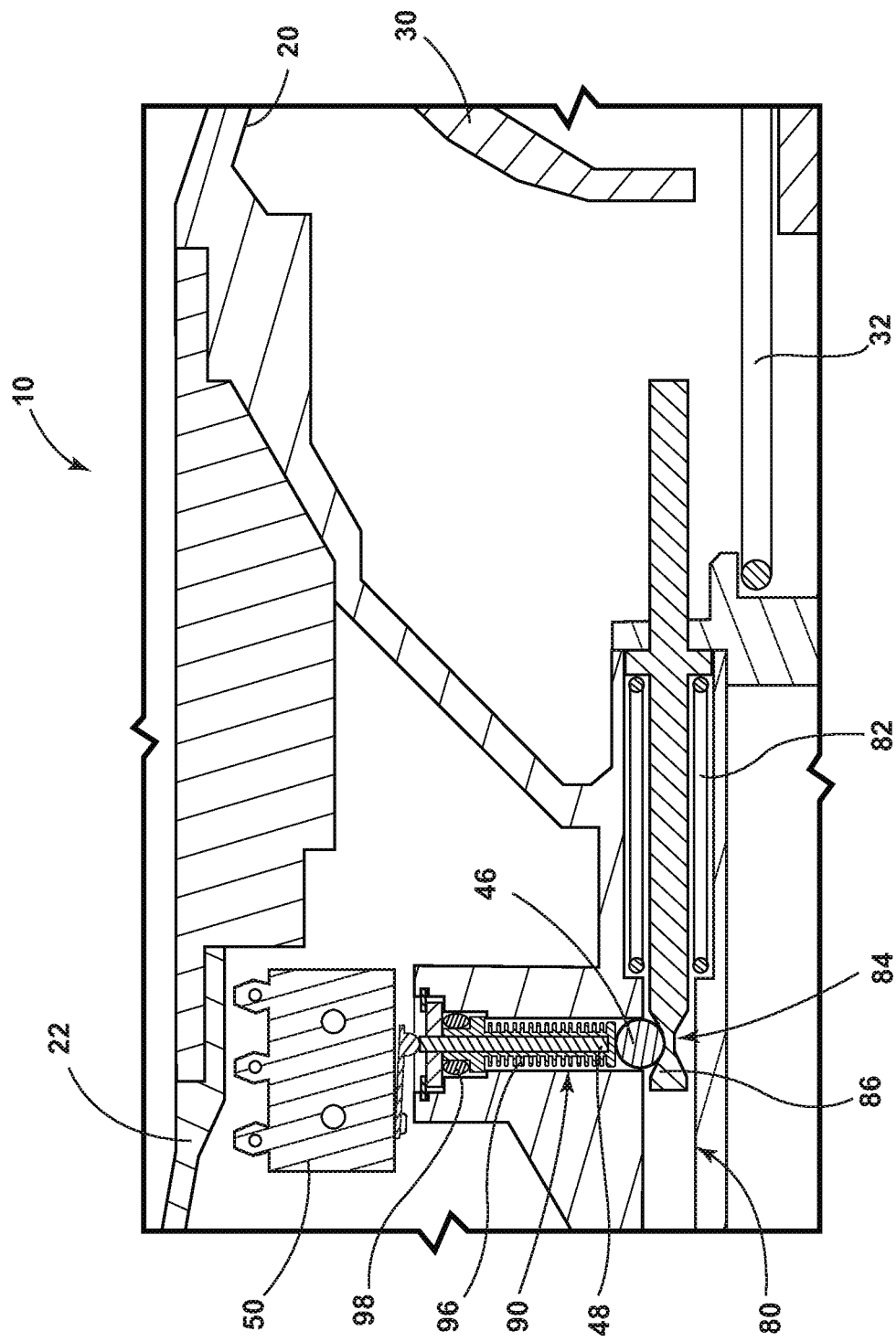
FIG. 1A is an enlarged cross-sectional view generally illustrating a portion of an embodiment of a fluid nozzle including a contact sensor according to teachings of the present disclosure.

In embodiments, a contact sensor 40 may be configured to determine if a poppet 30 is in a third position and/or has opened beyond a second position (e.g., if sufficient contact has been made between the nozzle 10 and the receptacle 60). In embodiments, such as generally illustrated in FIG. 1A, a contact sensor 40 may include an actuation rod 42, an actuation rod spring 44, a rolling member 46 (e.g., a ball, a cylindrical roller, etc.), a push rod 48, and/or a contact switch 50. An actuation rod 42 may be connected to the housing 20 such that the poppet 30 may contact the actuation rod 42 in the second poppet position, in the third poppet position, and/or in positions of the poppet between second poppet position and the third poppet position. Movement of the poppet 30 may cause movement (e.g., axial movement/translation) of the actuation rod 42, such as toward the second end 14 of the nozzle 10. An actuation rod 42 may be disposed substantially in parallel with an axis 10A of the nozzle 10. Additionally or alternatively, an actuation rod 42 may be disposed at least partially in an actuation rod recess 80 of the housing 20 that may be disposed substantially in parallel with an axis 10A of nozzle 10 (e.g., actuation rod recess 80 may extend in an axial direction). The actuation rod recess 80 may include a stepped configuration that may restrict movement of the actuation rod 42. An actuation rod spring 82 may bias poppet 30 toward first end 12 of nozzle 10. The actuation rod spring 82 may be disposed in the actuation rod recess 80 and may bias the actuation rod 42 toward the poppet 30 and/or the first end 12 of the nozzle 10.

With embodiments, an actuation rod 42 may include a groove 84 (e.g., a circumferential groove) that may be configured to at least partially receive a rolling member 46. If the poppet 30 is in a first position or between the first position and a second position (e.g., not in contact with actuation rod 42), the groove 84 may be aligned with a cavity 90 of housing 20 (see, e.g., FIG. 1A). The cavity 90 may be disposed substantially perpendicularly to the actuation rod 42 and/or to an axis 10A of nozzle 10. A rolling member 46 (or a plurality of rolling members 46) may be disposed at least partially in groove 84 and/or in cavity 90. As actuation rod 42 translates (e.g., in an axial direction), actuation rod 42 may push rolling member 46 into cavity 90 (e.g., in a radial direction). The groove 84 of the actuation rod 42 may include one or more tapered edges 86 that may facilitate pushing of the rolling member 46 into the cavity 90. A push rod 48 may be disposed at least partially in the cavity 90. The push rod 48 may be disposed substantially perpendicularly to the actuation rod 42. If the rolling member 46 moves into the cavity 90, the rolling member 46 may cause push the rod 48 to translate (e.g., in a radially outward direction) and/or to activate the contact switch 50. The contact switch 50 may be normally open or normally closed and may be configured to provide an indication that it has been activated (e.g., that the poppet 30 and the pedestal valve 62 are in sufficient contact and/or that the nozzle 10 has been inserted a sufficient distance into the receptacle 60). The contact switch 50 may, for example and without limitation, include a hermetically sealed switch that may provide an electrical signal when activated and/or deactivated. The contact switch 50 may be connected to an electronic control unit (ECU) 92.

In embodiments, a poppet 30 may move substantially axially between a first/closed position, a second/partially-open position, and/or a third/open position. A stroke length D1 of the poppet 30 between the first position and the second position may, for example and without limitation, be about 0.6 inches to about 0.8 inches, such as about 0.62 inches or about 0.75 inches. The actuation rod 42 may not move the rolling member 46 while the poppet 30 is disposed in a first position and/or between a first position and a second position. The actuation rod 42 may cause the rolling member 46 to move into the cavity 90 and activate the contact switch 50 via the push rod 48 if the poppet 30 moves a second distance/stroke length D2 from a first/closed position, such as from a second position to a third position. A distance D2 may, for example and without limitation, be about 0.8 inches to about 1.3 inches, such as about 0.84 inches to about 1.25 inches.

In embodiments, a contact switch 50 may be hermetically sealed and/or may include a micro-switch. A contact switch 50 may be disposed in a cavity 94 outside of the housing 20, such as at or about an outer end of the cavity 90. The cavity 94 may be provided between the housing 20 and a cover 22. One or more sealing members may be disposed at least partially in the cavity 90 of the housing 20. For example and without limitation, a first sealing member 96 may include a bellows seal that may be disposed partially and/or entirely around (e.g., circumferentially) the push rod 48. Additionally or alternatively, the first sealing member 96 may extend along substantially an entire length of the push rod 48 (e.g., other than a portion that may extend out of the cavity 90 to engage the contact switch 50). The first sealing member 96 may bias the push rod 48 radially inward. Additionally or alternatively, a second sealing member 98 may include an O-ring seal that may be disposed partially and/or entirely around (e.g., circumferentially) the push rod 48. A first sealing member 96 and/or a second sealing member 98 may provide a fluid seal in the cavity 90 between an inside and an outside of the housing 20.

Figure 4:
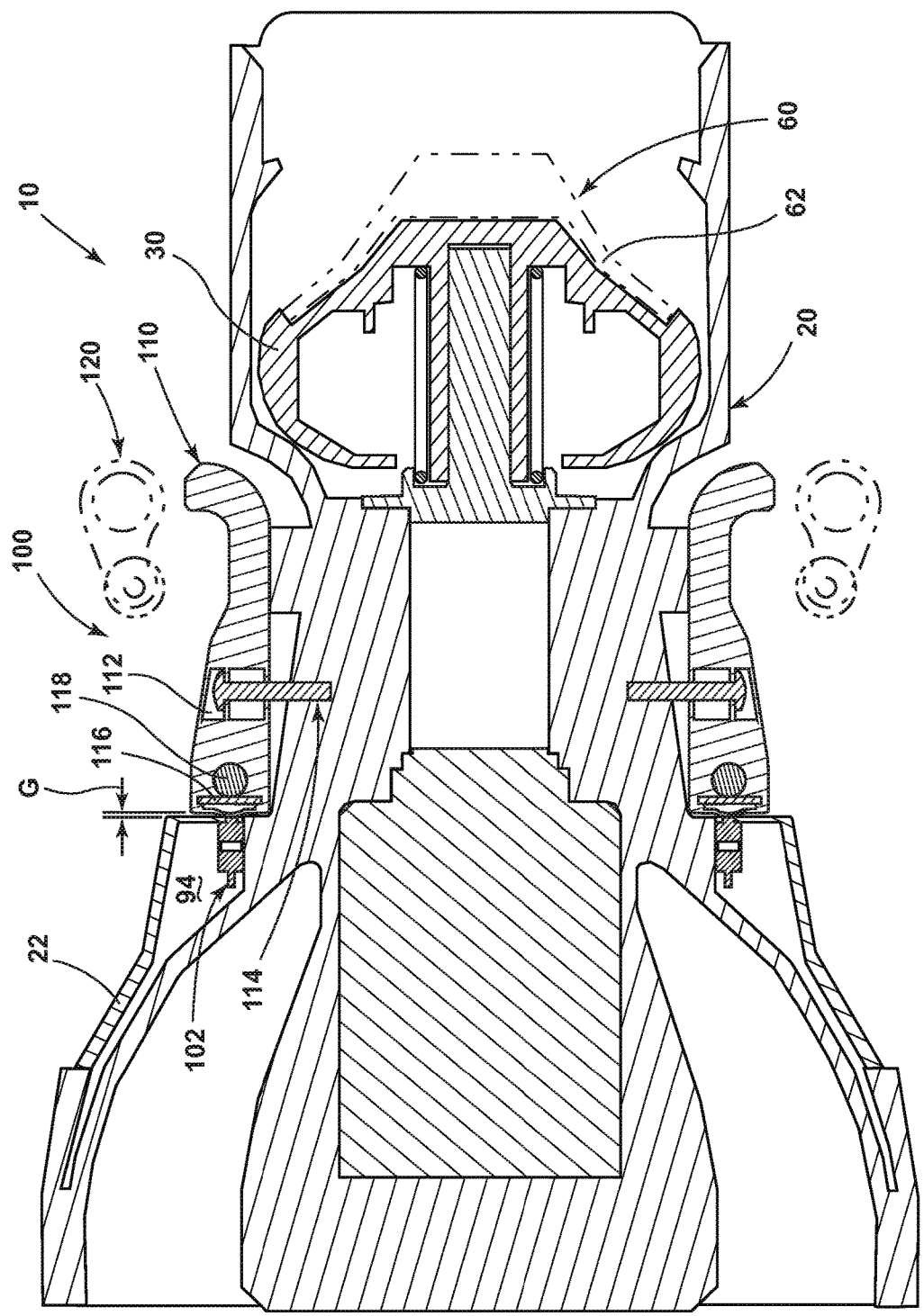
FIGS. 4 and 5 are cross-sectional views generally illustrating embodiments of fluid nozzles including a connection sensor according to teachings of the present disclosure.
Figure 5:
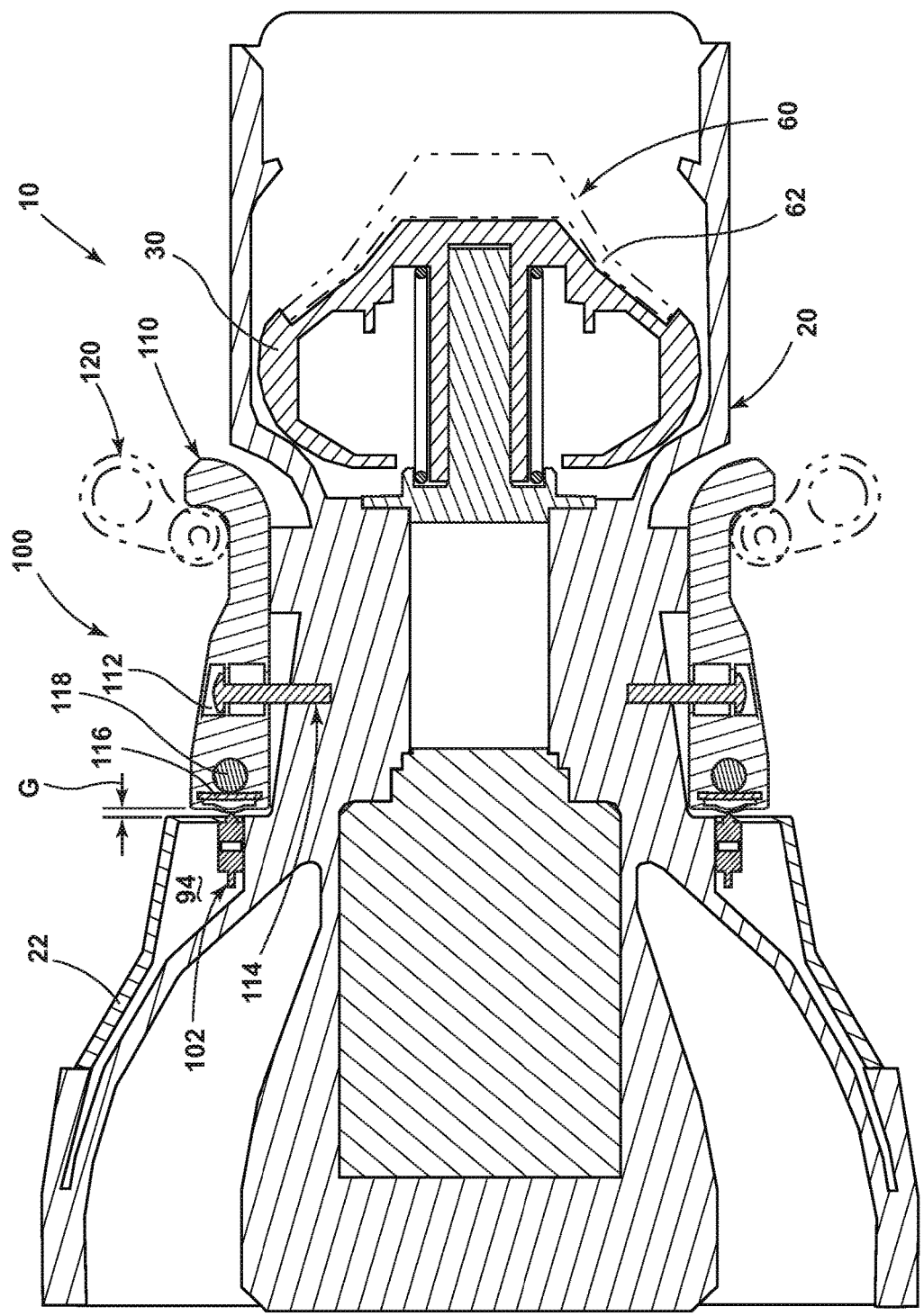

With embodiments, such as generally illustrated in FIGS. 4 and 5, a nozzle 10 may include a connection sensor 100. A connection sensor 100 may include a connection switch 102, such as a hermetically sealed micro-switch, that may be disposed in a cavity 94 outside of a housing 20 of nozzle 10. A nozzle 10 may include a latch 110 that may include an aperture 112, such as a slotted through hole. One or more latch screws 114 may be connected to the housing 20 and/or to the aperture 112, and may restrict movement of the latch 110 relative to the housing 20. The latch screws 114 may be disposed substantially perpendicular to an axis 10A of the nozzle 10. One or more biasing members 116 (e.g., a leaf spring) may apply a biasing force to a latch shaft 118 and/or the latch 110, which may bias the latch 110 toward and/or against the connection switch 102.

In embodiments, a receptacle 60 may include one or more rollers 120 that may rotate between a disengaged position, such as generally illustrated in FIG. 4, and an engaged position, such as generally illustrated in FIG. 5. As the rollers 120 move from a disengaged position to an engaged position, the rollers 120 may pull the latch 110 away from the connection switch 102 (e.g., cause the latch 110 to move/translate axially toward first end 12), which may activate the connection switch 102. For example and without limitation, the rollers 120 may cause an axial gap G between the latch 110 and the housing 20 to form and/or widen. A connection switch 102 may be configured to provide an indication (e.g., a "ready" signal) that the rollers 120 are engaged, which may indicate that nozzle 10 is sufficiently connected with the receptacle 60. The connection switch 102 may, for example, provide an indication to an ECU 92. With embodiments, fueling from a tanker aircraft through a nozzle 10 to a receptacle 60 may begin once the connection switch 102 provides an indication of a sufficient connection.

With embodiments, a nozzle 10 may include a contact sensor 40 and/or a connection sensor 100. For example and without limitation, portions of the contact sensor 40 may be spaced (e.g., circumferentially) from portions of the connection sensor 100, which may include a contact switch or switches 50 of a contact sensor 40 being spaced (e.g., circumferentially) from a connection switch or switches 102 of a connection sensor 100. In embodiments, a voice coil 122 may be connected to a nozzle 10 (see, e.g., FIGS. 1-3).

Figure 6:
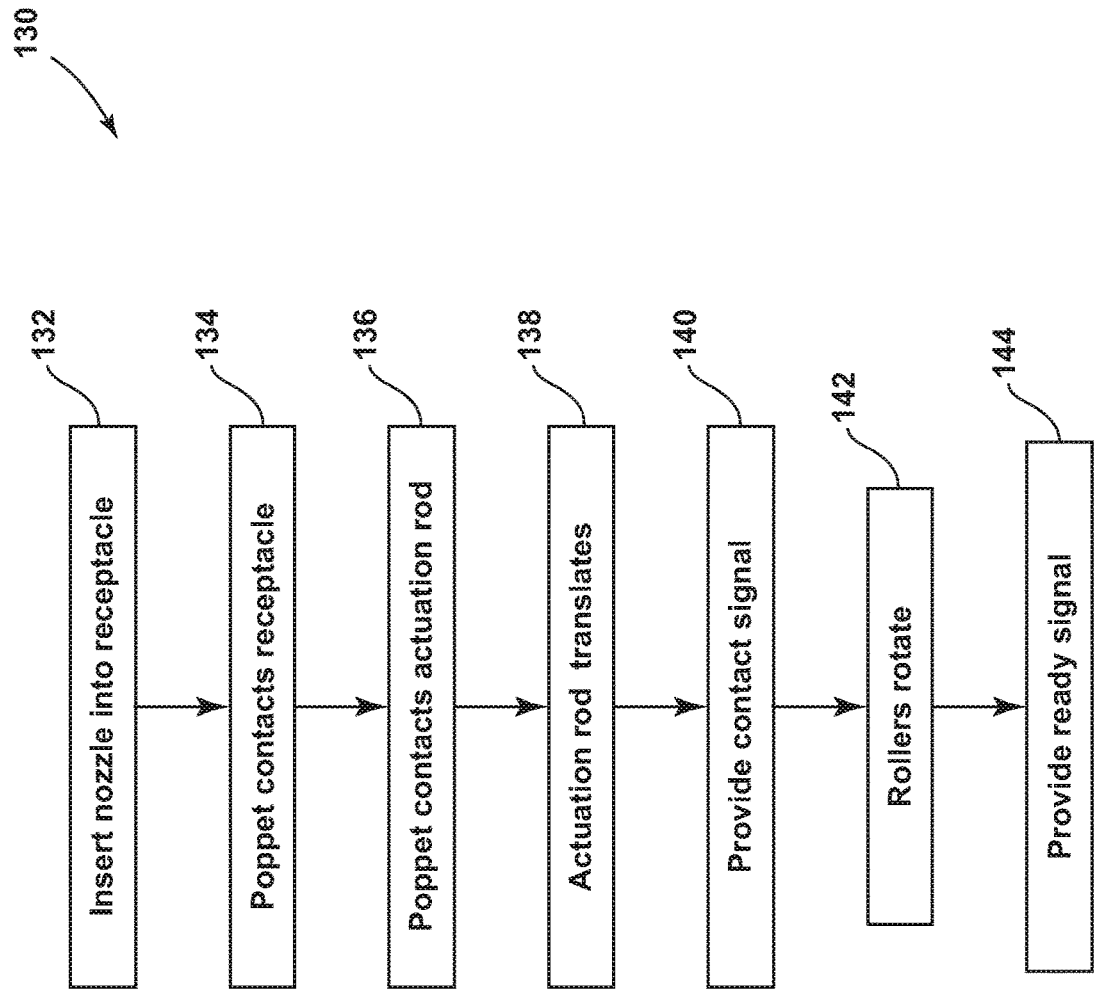
FIG. 6 is a flow diagram generally conveying an embodiment of a method of connecting a nozzle and a receptacle according to teachings of the present disclosure.

In embodiments, such as generally illustrated in FIG. 6, a method 130 of connecting a nozzle 10 with a receptacle 60 may include inserting a nozzle 10 at least partially into a receptacle 60 (step 132). Insertion of the nozzle 10 may continue until a poppet 30 of the nozzle 10 contacts a portion of the receptacle 60, such as a pedestal valve 62 of the receptacle 60 (step 134). Insertion of the nozzle 10 may continue until the poppet 30 contacts an actuation rod 42 of the nozzle 10, which may correspond to an insertion depth/stroke length D1 of about 0.6 inches to about 0.8 inches (step 136). Insertion of the nozzle 10 may continue, which may cause the actuation rod 42 to translate toward a rear end 14 of the nozzle 10 and/or may cause a rolling member 46 to move/translate radially outward (step 138). As the rolling member 46 moves/translates, a push rod 48 may be pushed radially outward, which may activate a contact switch 50 and/or provide an indication that the poppet 30 and the pedestal valve 62 are in sufficient contact (e.g., a "contact" signal) (step 140). As the nozzle 10 and the receptacle 60 are connected, rollers 120 of the receptacle 60 may rotate into contact with a latch 110 of the nozzle 10 and/or may cause translation of the latch 110, such as in an axial direction (step 142). A connection sensor 100 may sense movement of the latch 110 and may indicate a sufficient connection between the nozzle 10 and the receptacle 60 (e.g., provide a "ready" signal) when the rollers 120 cause translation of the latch 110 such that the latch 110 activates a connection switch 102 of connection sensor 100 (step 144). The contact sensor 40 and/or the connection sensor 100 may be connected to an ECU 92, and the ECU 92 may, for example and without limitation, be configured to determine that fueling may begin if one or both of the contact sensor 40 and the connection sensor 100 are activated (e.g., may receive indications of sufficient contact and sufficient connection, such as the "contact" and "ready" signals). The ECU 92 may be configured to control refueling, which may include beginning refueling if one or both of the contact sensor 40 or the connection sensor 100 are activated. Controlling refueling may include controlling a fuel pump that may be connected to the nozzle—for example, controlling one or more operational parameters associated with the fuel pump.

In embodiments, an ECU 92 may include an electronic controller and/or include an electronic processor, such as a programmable microprocessor and/or microcontroller. In embodiments, the ECU 92 may include, for example, an application specific integrated circuit (ASIC). The ECU 92 may include a central processing unit (CPU), a memory (e.g., a non-transitory computer-readable storage medium), and/or an input/output (I/O) interface. The ECU 92 may be configured to perform various functions, including those described in greater detail herein, with appropriate programming instructions and/or code embodied in software, hardware, and/or other medium. In embodiments, the ECU 92 may include a plurality of controllers. In embodiments, the ECU 92 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid nozzle, comprising:
   a housing;
   a poppet configured to move within the housing to control fluid flow in the housing; and
   a contact sensor connected to the housing and configured to sense a position of the poppet;
   wherein the contact sensor includes:
      an actuation rod configured to move when the actuation rod contacts the poppet;
      a push rod; and
      a rolling member disposed between the actuation rod and the push rod; and
   wherein, in a first position of the poppet, the actuation rod is disposed at a first distance from the poppet such that movement of the poppet from the first position to a second position does not cause the actuation rod to move the rolling member.

2. The fluid nozzle of claim 1, wherein the contact sensor includes:
   an actuation rod spring configured to apply a biasing force to the actuation rod; and
   a contact switch activated via movement of the push rod.

3. The fluid nozzle of claim 2, wherein, in the first position of the poppet, the rolling member is disposed in a groove of the actuation rod; and the actuation rod is configured such that as the poppet moves into an open position, the actuation rod pushes the rolling member out of the groove, the rolling member pushes the push rod, and the push rod activates the contact switch to indicate contact.

4. The fluid nozzle of claim 2, including a poppet spring configured to bias the poppet toward the first position.

5. The fluid nozzle of claim 2, wherein the actuation rod is configured to translate in an axial direction and the push rod is configured to translate in a radial direction.

6. The fluid nozzle of claim 2, including one or more latches and a connection sensor; wherein the connection sensor includes a connection switch configured to sense movement of the one or more latches, and to provide an indication of sufficient connection.

7. The fluid nozzle of claim 6, wherein the contact sensor and the connection sensor are circumferentially spaced from each other.

8. The fluid nozzle of claim 6, wherein the one or more latches are configured to translate in an axial direction relative to the housing upon actuation by one or more rollers of a receptacle.

9. The fluid nozzle of claim 2, wherein the contact switch is hermetically sealed and is configured provide an electrical signal when actuated.

10. The fluid nozzle of claim 2, wherein the push rod is disposed in a cavity of the housing and the contact switch is disposed in a cavity outside the housing.

11. The fluid nozzle of claim 1, including a bellows seal and an O-ring providing a fluid seal between the contact sensor and the housing.

12. The fluid nozzle of claim 1, wherein the poppet includes a third position; in the first position and the second position, the rolling member of the contact sensor is disposed in a groove of the actuation rod of the contact sensor; in the third position, the rolling member is disposed out of the groove; the first position is a closed position; the second position is a partially open position; and the third position is an open position.

13. The fluid nozzle of claim 12, wherein the first position and the second position are separated by the first distance; the first position and the third position are separated by a second distance; and the second distance is greater than the first distance.

14. The fluid nozzle of claim 13, wherein the first distance is about 0.6 inches to about 0.8 inches.

15. The fluid nozzle of claim 14, wherein the second distance is about 0.8 inches to about 1.3 inches.

16. A method of connecting a nozzle with a receptacle, the method comprising:
   inserting an end of the nozzle into the receptacle;
   moving a poppet of the nozzle into contact with a pedestal valve of the receptacle;
   moving the poppet into contact with an actuation rod;
   moving the actuation rod such that a rolling member moves into a cavity of a housing of the nozzle and the rolling member causes a push rod to move;
   activating a contact switch via movement of the push rod; and
   providing an indication of contact upon activation of the contact switch.

17. The method of claim 16, comprising rotating a roller of the receptacle to cause translation of a latch of the nozzle, activating a connection sensor via movement of the latch, and providing an indication of sufficient connection upon activation of the connection sensor.

18. The method of claim 17, wherein the actuation rod moves in an axial direction; the push rod moves in a radial direction; and the latch translates in the axial direction.

19. The method of claim 17, wherein the indication of contact and the indication of sufficient connection are provided to an electronic control unit (ECU) connected to the contact switch and the connection sensor, and the ECU is configured to control refueling.

* * * * *